United States Patent [19]
Peterson et al.

[11] 3,960,729
[45] June 1, 1976

[54] FLOW CONDUCTING CONNECTORS FOR DISC FILTER SECTORS AND INTERNAL PASSAGES OF FILTER SHAFT

[75] Inventors: C. Lynn Peterson; Clarence J. Peterson, both of Salt Lake City, Utah

[73] Assignee: Peterson Filters and Engineering Co., Salt Lake City, Utah

[22] Filed: Sept. 24, 1973

[21] Appl. No.: 400,128

Related U.S. Application Data

[60] Continuation of Ser. No. 185,707, Oct. 1, 1971, abandoned, which is a division of Ser. No. 863,947, Oct. 6, 1969, Pat. No. 3,659,716.

[52] U.S. Cl.............................. 210/232; 210/331; 210/347
[51] Int. Cl.².................... B01D 33/38; B01D 33/26
[58] Field of Search.................. 210/347, 331, 232; 285/155, 286

[56] References Cited
UNITED STATES PATENTS

| | | | |
|---|---|---|---|
| 1,908,821 | 5/1933 | Cornell, Jr. | 285/155 X |
| 1,911,654 | 5/1933 | Taylor | 285/286 X |
| 2,932,402 | 4/1960 | Logue et al. | 210/347 X |
| 3,591,009 | 7/1971 | Luthi et al. | 210/321 X |

*Primary Examiner*—Frank A. Spear, Jr.
*Attorney, Agent, or Firm*—Bruce G. Klaas

[57] ABSTRACT

Disc filter assembly in which a plurality of filter discs are mounted on common shaft for rotation to selectively dispose disc surfaces under vacuum in a confined body of slurry through a portion of said rotation and to discharge formed cake from said surfaces by "blow" action through another portion of rotation. Each disc has plurality of sectors in sequential arrangement circumferentially of shaft mounted on a hollow center shaft and communicating with passage-defining means controlled by a valve at the end of the shaft. A connector having a curved passage establishes communication between a disc sector and the passage-defining means which it connects by externally applied welding.

22 Claims, 14 Drawing Figures

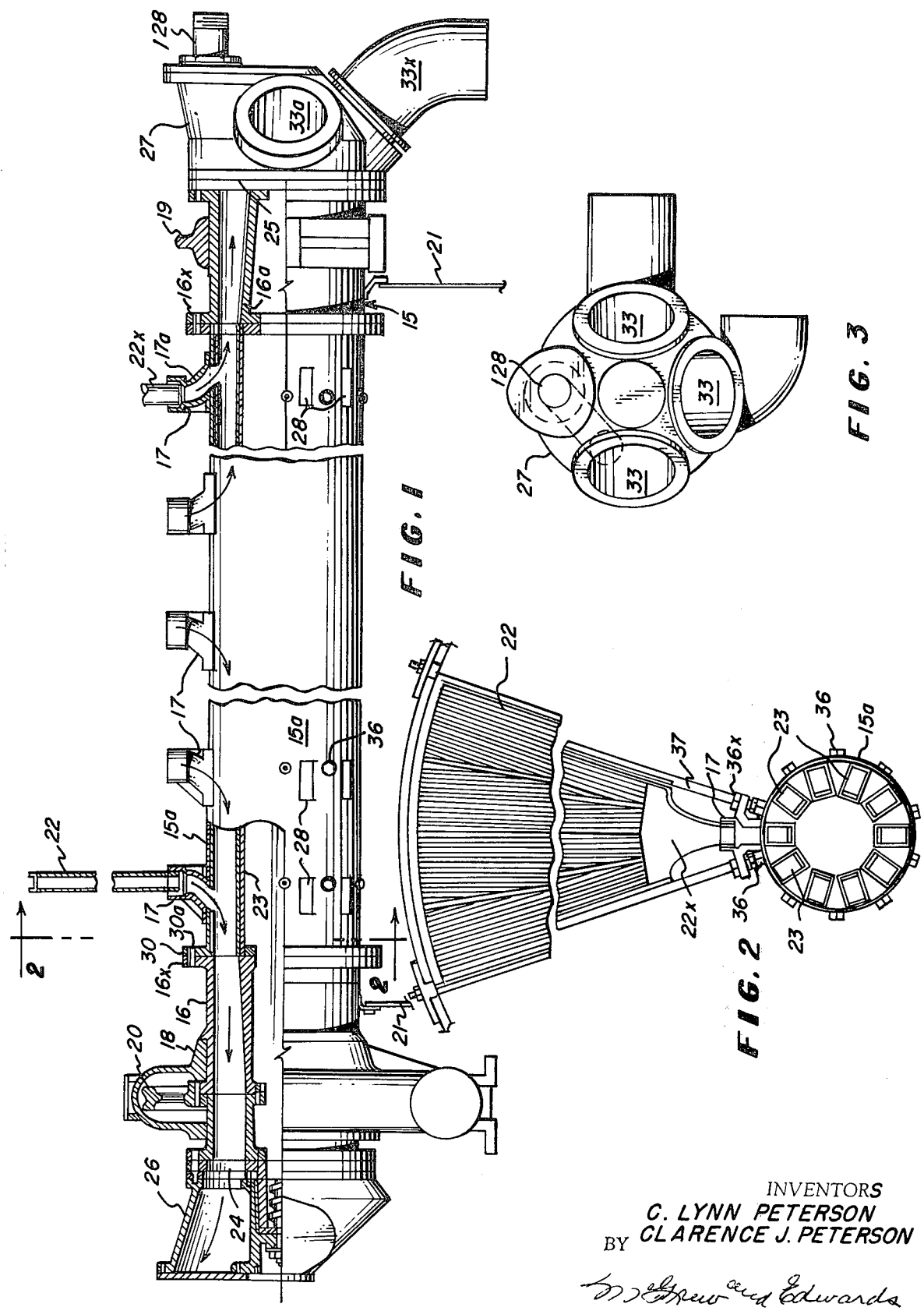

INVENTORS
C. LYNN PETERSON
CLARENCE J. PETERSON
BY
McGrew and Edwards
ATTORNEYS

INVENTORS
C. LYNN PETERSON
CLARENCE J. PETERSON
BY

ATTORNEYS

FLOW CONDUCTING CONNECTORS FOR DISC FILTER SECTORS AND INTERNAL PASSAGES OF FILTER SHAFT

This application is a continuation of application Ser. No. 185,707, filed Oct. 1, 1971, now abandoned, which is a division of our copending application Ser. No. 863,947, filed Oct. 6, 1969, for Filter Assembly with Filtrate Flow Control and Control Components now U.S. Pat. No. 3,659,716.

This invention relates to disc filter construction and more particularly relates to a novel type of connector defining a passage between a sector bell and a conduit in the shaft of a disc filter.

A difficulty has been experienced with fabricated shafts using circular tubes as conduits, in that the relatively thin wall tends to erode rapidly under the blast or downwardly directed nozzle effect of the filtrate and air flow immediately under the sector where the sector bell connects to the shaft. In vacuum filter design, an effort is made to maintain velocities in the various drainage channels that will permit the air flow to sweep out residual filtrate. If the velocities are too low, there is a tendency for residual filtrate to be retained in the drainage channels. Then when the reverse pressure of "blow" comes on to discharge the cake, this residual filtrate is driven back into the cake and defeats the purpose of the filter which is to dewater the cake to the lowest possible filtrate or moisture content.

An innovation of our invention is the provision of a novel type of connector for joining a sector bell passage with an interior passage of the shaft. This connector is a casting having a radius turn to the lengthwise axis of the interior passage, and preferably the passage in the castings has an increasing cross-section as it approaches the interior passage or is curved to prevent direct outflow, thereby lessening the blast effect of flow into said interior passage. By turning and expanding the flow, any erosion that results will occur within the connector which is easily replaced at low cost compared with interior tube replacement. Such casting also is suited for use as a replacement part in filters now having a right angle turn connection.

Still another innovation of this invention is to utilize outside welding procedure in the assembly. The exterior component of the assembly may be commercial pipe, such as steel pipe, plastic pipe or similarly shaped commercial tubing such as oil well casing tubes. The interior conduits comprise metallic or plastic pipe or tubing, preferably of oblong or rectangular section. When the exterior component is to be joined to an interior tubular member, alined openings are provided as by torch cutting, if metallic, so as to provide a relatively narrow gap between the oblong tube and the outer shaft which can receive an arc or gas weld from above, or when plastic components are used and similar openings are formed, the connection is made by heat welding from above.

It is an object of the invention to provide novel flow control means and connections in a disc filter having a novel center shaft construction.

Other objects reside in novel details of construction and novel combinations and arrangements of parts, all of which will be set forth in the course of the following description.

The practice of our invention will be described with reference to the accompanying drawings illustrating a typical center shaft construction and other structural assemblies utilizing novel features of our invention, and which may be produced in a variety of materials. In the drawings, in the several views of which like parts bear similar reference numerals, FIG. 1 is a partially broken side elevation view of a center shaft assembly according to our invention with broken areas shown in section to illustrate the shaping and arrangement of interior parts;

FIG. 2 is a sectional view taken along the line 2—2, FIG. 1, and appearing essentially as an end elevation of one filter sector supported by and connected to the center shaft shown in FIG. 1;

FIG. 3 is an end elevation view of one valve head shown in the FIG. 1 assembly;

Figure 4:
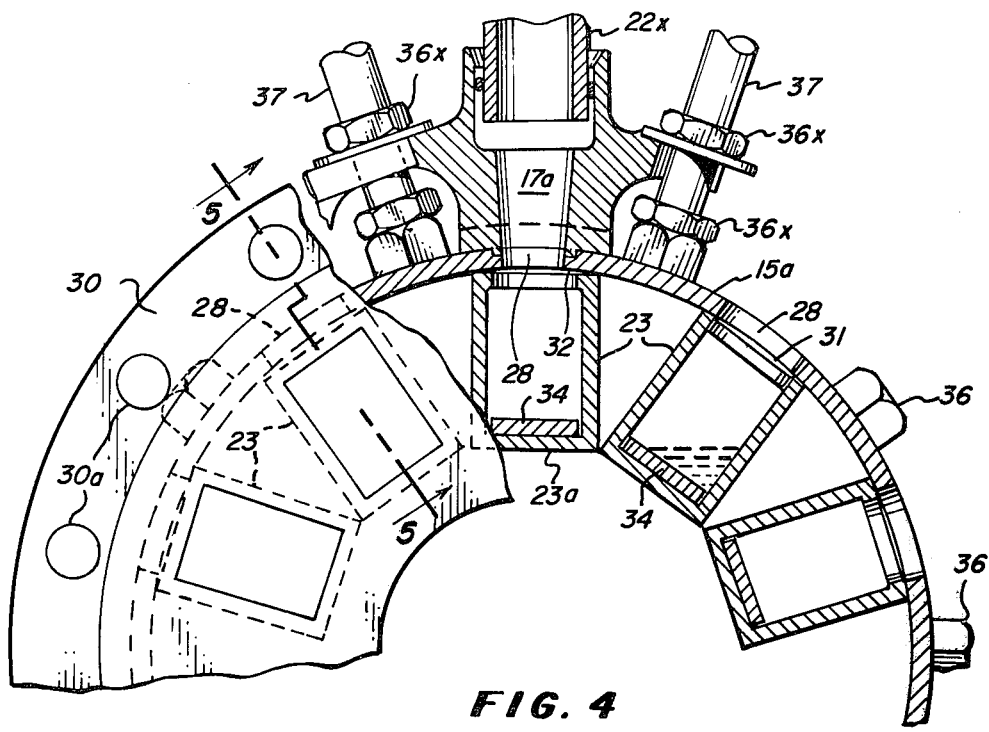
FIG. 4 is a fragmentary partially broken end elevation view similar to FIG. 2 and drawn to an enlarged scale, showing details of the center shaft construction and sector mounting thereon in section.

The shaft assembly illustrated in FIG. 1 comprises support shaft means in the form of an exterior component 15 which as shown is an elongated hollow body such as tubing, pipe or the like, preferably having a cylindrical cross-section with its intermediate section 15a flanged at its ends for connection to flanged transition castings 16 and 16a which in turn are connected with valve heads at both ends as shown, or at least at one end. When all the filter components are assembled, the support shaft member will be horizontally disposed and suitably supported for rotation about a central longitudinal axis with a plurality of filter discs carried by the shaft being immersed in a slurry tank during a part of each revolution of the shaft to form a cake thereon and suitable discharge mechanism, such as scrapers, will remove formed cake from the disc surfaces through another portion of the revolution.

The tank, discharge mechanism and shaft mounting are not features of the present invention and have not been illustrated in detail. The sector assembly and fastening may be of any suitable type and as shown in FIG. 2 embody features of Ser. No. 651,344, filed June 19, 1967, for Disc Filter Sector Assembly and Separable Components Thereof, now U.S. Pat. No. 3,485,376 of Dec. 23, 1969. Bearings 18 and 19 support opposite ends of the shaft and bearing 18 is a part of a drive assembly for the shaft including gearing 20. Other supporting structure 21 is shown. While a plurality of discs will be supported lengthwise of the shaft, each comprising a plurality of separate sector assemblies 22 in sequential arrangement circumferentially of the shaft, only one such sector assembly has been shown in FIGS. 1 and 2. Each sector assembly includes radially extending filtrate flow passage means comprising a filtrate collection sector bell member 22x having a gradually decreasing cross-sectional area terminating in a radially extending cylindrical passage portion next adjacent and radially spaced from the support shaft.

The shaft assembly includes a plurality of axially extending filtrate flow passage means in the form of separate conduit members 23 mounted in circumferentially spaced arrangement interiorly of the of the support shaft, each such conduit member such in fluid conductive communication with a sector bell 22x and ports 24 and 25 of a pair of valve heads 26 and 27 mounted on opposite ends of the shaft. Usually the conduit members 23 are other than round, preferably being of oblong or rectangular section, and may be available commercial tubing having the desired shape and dimension including round. In the assembly illustrated in FIG. 1, the intermediate section 15a of the support shaft comprises a major part of the total length of the shaft and will carry all of the discs and sectors of the assembly.

Figures 5, 6:
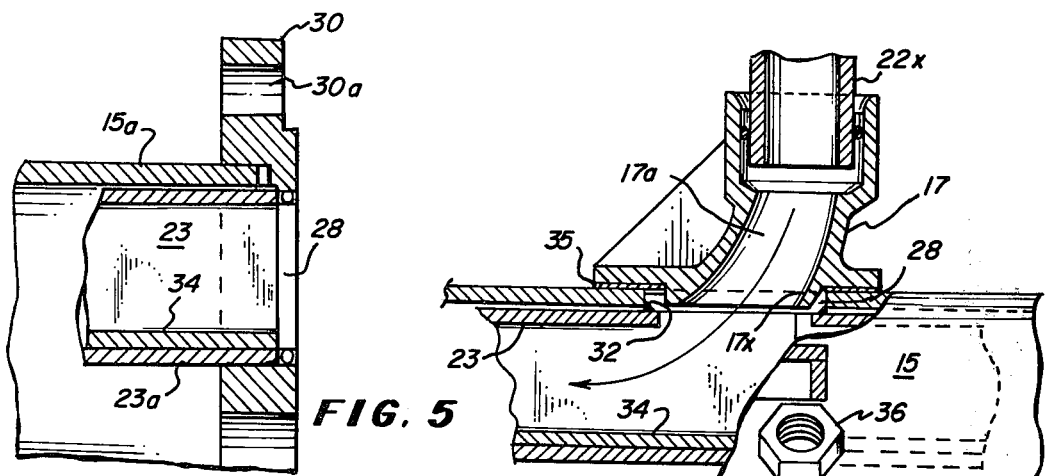
FIG. 5 is a fragmentary section taken along the line 5—5, FIG. 4, and showing an arrangement for use of abrasion-resistant inserts in the bottom of the interior tubes of the shaft.
FIG. 6 is a fragmentary partially broken side elevation view similar to FIG. 4 and drawn to the scale of FIG. 4, showing cutting and welding details and the flow control of the casting utilized as the connector between a sector bell and an interior tube of the center shaft assembly.

A convenient arrangement for interior conduit and exterior sector support has been provided and is illustrated in FIG. 1, which is representative of a 10-disc filter with double ended valve assembly and metallic shaft components. A novel type of sector assembly connecting means in the form of a casting 17 has been utilized which comprises filtrate flow passage means having flow direction changing means to turn the radial flow of filtrate from the sector assemblies in an axial direction towards the associated valve and in the 10-disc arrangement, five of said castings are directed toward valve 27 and the other five are directed toward valve 26 at the drive end. Mounting means are provided to permit torch cutting rectangular openings 28 through the wall of intermediate section 15a of the support shaft where each supported sector assembly is to be mounted and an exterior welded connection is made between section 15a and the conduit members 23 as best shown in FIGS. 4, 5 and 6.

The connector means 17 not only prevent direct blast effect on conduit members 23 but also provide connecting passage means 17a of increasing cross section with a radius turn to the lengthwise axis of the connected conduit member 23 which extends between an inlet opening in fluid communication with the filtrate collecting member 22x and an outlet opening in fluid communication with the conduit member 23, the outlet opening being axially offset from and larger than the inlet opening thereby providing filtrate flow direction changing means which turns and expands the flow so that any erosion of consequence takes place within the casting. The castings are removably mounted and easily replaced when they eventually become worn. A great deal of the turbulence of the right angle turn of conventional connections is avoided and a reduction in pressure drop is obtained. When the rectangular openings 28 are cut in intermediate support shaft section 15a, the section modulus is reduced by about 50% but this is replaced with oblong or rectangular to depending flange portions of the castings that have a relatively high section modulus due to their shape.

In addition to their utilization as components of the novel shaft assembly shown in FIG. 1, the castings 17 may be installed in prior art cast iron shafts of previously installed equipment which is still operational to prevent erosion of the right angle connection previously provided, and better hydraulics also are attained because of such modification. As shown in FIG. 6, castings 17 have a depending portion 17x which projects downwardly into the welded opening and thereby provides protection for the welded seams 32 between the inner peripheral surface of support shaft 15 and the adjacent outer peripheral surface of the outer wall portion of conduit 23 against the scouring action of the flow.

Figure 6A:
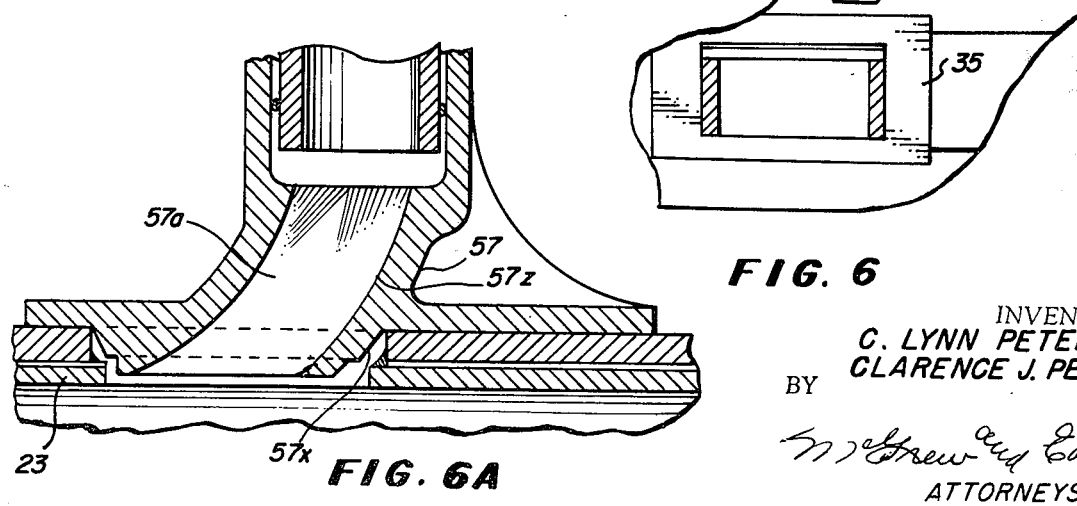
FIG. 6A is a partially broken vertical section similar to FIG. 6 and showing a modified form of connector for directing blast discharge away from a direct flow onto the walls of an interior tube with which it is connected.

A modified form of connecting means casting has been shown in FIG. 6A. This casting 57 has a connecting passage 57a extending from an inlet opening in an upper recess portion to a bottom discharge outlet opening defined by a flanged depending portion 57x. Passage 57a is curved sufficiently so that the top inlet opening of said passage is within the vertical plane of the lower curved wall 57z and this curved portion provides protection against blast effect from the associated sector assembly passing directly onto a wall of the associated interior conduit member 23 with which it is connected, as all flow in direct descent impinges on the curved surface 57z and is directed forwardly into the conduit members 23 due to the change in direction.

When the flow approaches the valve heads 26 and 27, the velocity is reduced by the transition casting 16 or 16a which provides a passage of increasing cross section in the direction of the valve. The expansion of the flow reduces its velocity and greatly diminishes the erosion and blast out in the valve head. Other features of the construction and functioning of the valves 26 and 27 not shown in detail in FIG. 1 have been illustrated in other views of the drawings and will be described hereinafter.

It will be apparent from the illustration of the hollow support shaft assembly construction shown in FIG. 1 and the preceding description relating thereto that such an assembly substantially eliminates the need for special patterns, as the main shaft components, particularly those shown in intermediate section 15a comprise an outer component which may be formed of tubing or pipe and preferably is cylindrical. The wall thickness of said member only requires that it provide sufficient strength to support the interior components and the number of discs mounted on its exterior surface which are required for a given assembly. The interior passages are formed by tubular components and are supported from the exterior component usually by welding.

The shaping of the exterior component and the inner tubular members particularly in cross section may be selected to meet both strength and durability requirements, as well as providing improved hydraulics in the flow of the fluid in and out of the shaft. Where the dimensional requirements permit the use of available industrial materials, as, for example, steel or plastic pipe for use as the outer component, it is only necessary in a given assembly to cut the pipe sections to the desired length, secure flanges on the ends where flanges are not otherwise provided and then cut the tubular members for the interior assembly to the desired length. Such members preferably are other than round in section and for best effects rectangular or oblong sections are utilized. Such members may be formed from relatively thin material particularly when an insert member is provided to protect the bottom surface from blast effect from the associated filter sector.

Axially and circumferentially aligned openings 28 are formed in the juxtapositioned outer walls of the support shaft and the conduits 23 as by torch cutting when metal tubing or pipe is used or forming similar openings in plastic pipe, after which the seam therebetween is welded to secure the conduits in place relative to the outer shaft and to provide a fluid tight joint. The connecting means castings are fitted in the openings so formed in the exterior component and also in the tubular conduits. The support shaft and conduits 23 are connected as by electric arc or gas welding for metallic assemblies and heat welding for plastic assemblies. Consequently, the only patterns required are for the connecting means castings 17 and the transition castings 16 and 16a adjoining the valves 26 and 27, and only a minimum of machining is required to complete a given shaft assembly. The shaft when so assembled is greatly reduced in weight without sacrificing durability and the principal wear occurs on component parts which are easily replaced at low cost when necessary.

Figure 9:
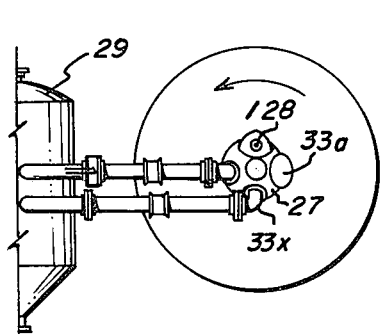
FIG. 9 is an end elevation of the valve head end of the center shaft assembly as shown in FIG. 1 and drawn to a reduced scale to illustrate a lefthand connection to an associated vacuum receiver.

A novel feature of the valve assembly 27 shown in FIGS. 1 and 3 is the provision of a blow connection which is on the vertical center line as viewed in FIG. 3. Frequently in plant layout, it will be advantageous to have the vacuum receiver on only one side of the filter. The blow connection 128 shown in FIG. 3 is a bulkhead type, i.e., it is fabricated rather than cast into the valve head 27 and can go to either side of the valve chamber 27, depending on the hand of the valve which is required. Such arrangement is not only advantageous in the layout by being able to locate the receiver 29 on either side of the filter as shown in FIGS. 9 and 11, but in addition a triple connection can be provided as shown at 30 in FIG. 10. In the latter arrangement, a very high volume of air flow will be handled by the double connection to the drying zone of the filter. Thus, only one pattern is required for both left and righthand valve heads. Openings 33 in valve head 27 which are not connected are closed by a suitable plug 33a (FIG. 1).

A preferred arrangement for assembly of the tubular conduits 23 interiorly of the outer component 15a and the use of the connecting means castings 17 for conducting flow from and into the sector bell members 22x will now be described with reference to FIGS. 4, 5 and 6. As shown in FIG. 4, the outer component 15a of the shaft has flanged end portions 30, each having a series of circumferentially spaced openings 30a for interconnection with similar flanged portions 16x on the transition castings 16 and 16a as by bolting. A suitable number of access openings 28 are formed circumferentially in the wall of outer component 15a in rows spaced lengthwise of said component to seat the required number of sector assemblies 22 forming each disc and the required number of discs. By using rectangular tubing for conduits 23, a relatively narrow gap 31 is established between the inner peripheral surface of the support shaft and outer surface of conduit 23 which can receive an arc weld 32 without too much bleedout or additional welding. Also, to further reduce erosion of conduits from blast effect, abrasion-resistant strips 34 may be fitted against the bottom wall 23a of the tubular conduits 23.

Also as shown in FIG. 6, casting 17 is made to permit depending portion 17x to project downwardly into the opening 28 and thereby provides protection for the welded seams against the scouring action of the flow. Casting 17 may be held in place by suitable releasable fastening means in the form of rods 37 and adjustable nuts 36x and sealed against outer component 15a by a rectangular gasket 35. Rods 37 are associated with flange portions of connecting means castings 17, FIG. 4, and tightened by suitable sealing means in the form of the half nuts 36x on the radial rods 37 cooperating with nuts 36 fixedly mounted on the outer peripheral surface of the support shaft.

Valves 26 and 27 shown in FIGS. 1, 3, 7 and 8 are structural and functional equivalents and have been given different reference numerals to designate their left and righthand positions as viewed in FIG. 1. Valve 27, for example, has a cone surface 27m of about 45° and valve 26 is similarly shaped. The openings 33 are formed on this conical surface (FIG. 3) and the snout connections 33x are of relatively short length, giving a good functional appearance and effect. The spring 36 (FIGS. 1 and 7) is used to exert pressure on the valve head until it is seated and then the vacuum holds the valve faces tightly together. The stem or threaded bolt 39 turns with the shaft. The spring is stationary against the valve head and a thrust bearing (not shown) lets the stem rotate against the stationary spring.

Figure 7:
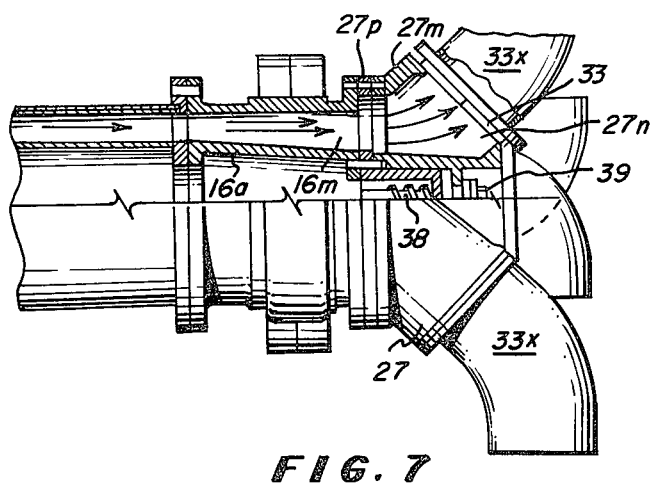
FIG. 7 is a side elevation view, partially in section of a transition casting and its connection with a valve head for reducing erosion effects to which the valve head is subjected.
Figure 8:
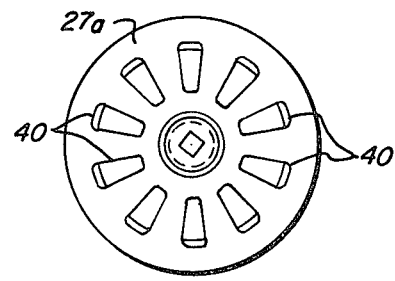
FIG. 8 is an end elevation or plan view of the wear plate port arrangement included in the transition assembly shown in FIG. 7.

FIG. 8 shows a wear plate 27p of the type used in an assembly such as shown in FIG. 7 wherein said wear plate is fitted onto the flanged end of transition casting 16a and has a series of elongated radial ports 40 in circumferentially spaced arrangement which aline with the passages 16m in the transition casting and although causing some restriction of the passage direct the expanding flow into another expanding passage 27n within valve 27 as indicated by the expanding arrow pattern in FIG. 7. This arrangement reduces incoming flow velocity and prevents erosion and blast-out in the valve head.

Figure 12:
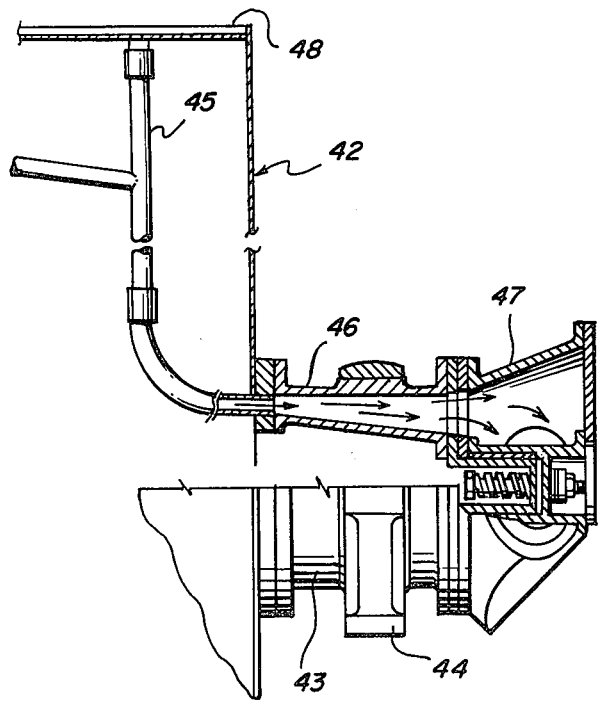
FIG. 12 is a vertical fragmentary section of a valve and associated transition casting mounted on a rotary drum and illustrating the increasing cross section passage arrangement of such an installation.
Figure 13:
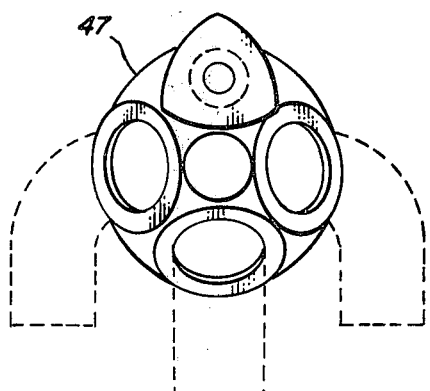
FIG. 13 is an end elevation of the valve shown in FIG. 12 illustrating a triple connection with a vacuum receiver by dash line representation.

As mentioned in the earlier description, a combination of a valve, such as valve 27, and a transition casting, such as 16a, are well suited for controlling pressure flow in a drum filter installation in the manner illustrated in FIGS. 12 and 13. The drum filter is shown at 42 as having a central trunnion 43 supported for rotation in a bearing assembly 44 with piping connections 45 extending from its peripheral filtering surface 48 to the inlet end of a transition casting 46, the opposite end of which connects to a valve 47. Except for minor dimensional differences, casting 46 is the same as casting 16a and valve 47 is the same as valve 27 previously described.

Figure 10:
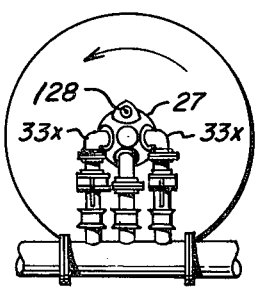
FIG. 10 is an end elevation similar to FIG. 9 and illustrating a triple connection with a vacuum receiver which may be provided.
Figure 11:
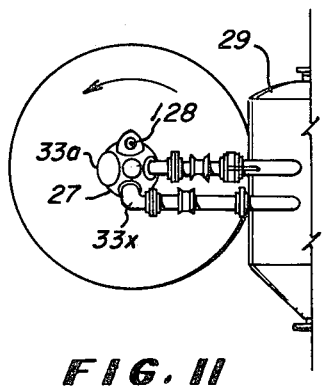
FIG. 11 is another end elevation similar to FIG. 9 and illustrating a righthand connection to the vacuum receiver.

FIG. 13 illustrates valve 47 as having a triple connection with a vacuum receiver (not shown) which is similar to the arrangement shown in FIG. 10. Such an arrangement permits location of the receiver on whichever side of the filter best suits the requirements of the plant layout. The passage arrangement of casting 46 and valve 47 effectively reduces flow velocity and prevents erosion within the valve head.

We claim:

1. In a disc type filter unit in which a plurality of filter segment assemblies are mounted on a common shaft means for rotation therewith to form a cake on the filter segment assemblies and to remove filtrate therefrom through radially extending passage means in said filter segment assemblies and through axially extending passage means in said shaft means, the improvement of passage connecting means for each of said filter segment assemblies mounted on the outer periphery of said shaft means and comprising:
 a filtrate passage having an inlet opening connected to said radially extending passage means and an outlet opening connected to said axially extending passage means, and filtrate flow direction changing means in said filtrate passage to change the radial direction of filtrate flow from said radially extending passage means to an axial direction of flow in said axially extending passage means.

2. The invention as defined in claim 1 and wherein said filtrate flow direction changing means comprises a surface of said filtrate passage extending between said inlet opening and said outlet opening and having a radius-like turn from said inlet opening toward said outlet opening in the axial direction of flow to be established in said axially extending passage means.

3. The invention as defined in claim 2 and wherein said filtrate passage is of increasing volume from said inlet opening to said outlet opening.

4. The invention as defined in claim 2 and wherein said outlet opening is axially offset relative to said inlet opening in the direction of axial flow of filtrate in said axially extending passage means.

5. The invention as defined in claim 2 and further comprising:
 an access opening in said shaft means connected to said axially extending passage means,
 a mounting flange on said connecting means mounted on the outer periphery of said shaft means about said access opening, and a portion of said connecting means extending into said shaft means through said access opening for connecting said outlet opening to said axially extending passage means within said shaft means.

6. The invention as defined in claim 5 and wherein said access opening and said portion of said connecting means have a rectangular cross-sectional configuration.

7. A disc type filter unit comprising:
 hollow elongated supported shaft means rotatable about a central axis extending longitudinally thereof,
 a plurality of axially extending filtrate passage means fixedly mounted within said support shaft means,
 a plurality of radially outwardly extending filter segment assemblies fixedly mounted on the outside of said support shaft means and being rotatable therewith,
 each of said filter segment assemblies having radially inwardly extending filtrate passage means extending through said support shaft means and being connected to one of said axially extending filtrate passage means within said support shaft means,
 means to establish flow of filtrate from each of said filter segment assemblies radially inwardly through said radially inwardly extending filtrate passage means to said axially extending filtrate passage means and in one axial direction along said axially extending filtrate passage means, and
 filtrate flow direction changing means mounted between said radially inwardly extending filtrate passage means and said axially extending filtrate passage means to substantially change the radial direction of filtrate flow from said radially inwardly extending filtrate passage means to the one axial direction of filtrate flow as the filtrate flow enters said axially extending filtrate passage means.

8. The invention as defined in claim 7 and wherein: said filtrate flow direction changing means comprises a passage portion having a curved surface extending between an inlet opening connected to said radially extending passage means and an outlet opening connected to said axially extending passage means, the outlet opening being axially offset from the inlet opening in the one axial direction.

9. The invention as defined in claim 7 and wherein said flow passage portion gradually increases in cross-section from said inlet opening to said outlet opening.

10. The invention as defined in claim 7 and wherein: said support shaft means having a cylindrical outer wall providing a cylindrical outer peripheral surface and a cylindrical inner peripheral surface defining an elongated cylindrical chamber,
 a first access opening formed in the outer wall of said support shaft means for each of said filter segment assemblies and extending between said outer peripheral surface and said inner peripheral surface,
 each of said axially extending passage means comprising an axially extending tubular member fixedly mounted in said chamber with an outer wall located in juxtaposition to the inner peripheral surface of said support shaft means,
 a second access opening formed in the outer wall of one of said axially extending passage means in axial alignment with one of each of said first access openings,
 a connecting member for each of said filter segment assemblies mounted on the outer peripheral surface of said support shaft means about said first access opening and having filtrate connecting passage means extending between a radially outwardly located inlet opening connected to said radially extending passage means in each of said filter segment assemblies and a radially inwardly located outlet opening axially offset from said inlet opening in the one direction and connected to said axially extending filtrate passage means, and
 said filtrate flow direction changing means comprising a curved surface in said filtrate connecting passage means extending between said inlet opening and said outlet opening and facing in the one direction.

11. The invention as defined in claim 10 and wherein: each axially extending tubular member being welded to said support shaft means about the first and second access openings.

12. The invention as defined in claim 11 and further comprising disengageable mounting means between said connecting member and the outer peripheral surface of said support shaft means to permit removal and replacement of said connecting member.

13. The invention as defined in claim 12 and further comprising:
    sealing gasket means mounted on the outer periphery of said support shaft means between said connecting member and said support shaft means about said first access opening.

14. The invention as defined in claim 13 and further comprising disengageable mounting means connecting each of said filter segment assemblies to said connecting member to permit removal and replacement of said connecting member.

15. The invention as defined in claim 13 and wherein said mounting means comprising a first flange portion on said connecting member extending outwardly beyond said first access opening for supportive engagement by the outer peripheral surface of said support shaft means.

16. The invention as defined in claim 15 and further comprising a second flange portion on said connecting member radially outwardly spaced relative to said first flange portion, and
    releasable fastening means associated with said second flange portion to releasably hold said connecting member on the outer periphery of said support shaft means.

17. The invention as defined in claim 16 and wherein:
    said releasable fastening means also being associated with said filter segment assemblies to releasably hold said filter segment assemblies on said support shaft means in association with said connecting member.

18. A disc filter comprising:
    a rotatable core provided with longitudinally extending core passage means and core outlet means for discharging filtrate from the filter;
    filter disc means mounted on said rotatable core for filtering material;
    a plurality of filtrate passages in said filter disc filter disc means connected to said core passage means and arranged to communicate through said core passage means with said core outlet means; and
    filtrate flow direction changing means between said filtrate passages and said core passage means for directing filtrate discharged to said core passage means from said filtrate passages in a direction towards said core outlet means,
    said filtrate flow direction changing means comprising curved passage surface means facing toward said core outlet means and defining filtrate flow openings through which said filtrate passages communicate with said core outlet means, and said flow openings being located to cause filtrate discharged by said filtrate passages to flow into said core passage means in a direction towards said core outlet means.

19. A disc filter according to claim 18 and wherein:
    said filter disc means includes a plurality of filter discs spaced longitudinally of said core;
    said filter discs each comprising a plurality of filter sections generally side-by-side and including said filtrate passages; and
    each of said filter sections having one of said filtrate flow direction changing means connecting the filtrate passages therein to said core passage means with said flow openings being located adjacent the side of their respective filter sections most adjacent to said core outlet means.

20. A disc filter comprising:
    a rotatable core provided with longitudinally extending core drainage passage means and core outlet means at one end of said core for discharging filtrate from the filter;
    a plurality of filter discs each adapted to encircle said core and including generally side-by-side filter sections having open-ended drainage passages for discharging filtrate from said filter discs to said core drainage passage means;
    disc mounting means for supporting said filter discs around said core at locations spaced along the length of said core, said open-ended drainage passages being connected to said core drainage passage means through said core to communicate with said core outlet means; and
    filtrate flow direction changing means between said open-ended drainage passages and said core drainage passage means for directing filtrate discharged to said core drainage passage means from said open-ended drainage passages in a direction towards the one end of said core, said filtrate flow direction changing means each comprising a curved passage surface facing generally towards the one end of said core and defining a filtrate discharge opening through which said open-ended drainage passage means is connected to said core drainage passage means and to said core outlet means, said filtrate discharge opening being located to cause filtrate discharged from said open-ended drainage passage means to flow in the direction towards the one end of said core.

21. A disc filter according to claim 20 and wherein: said disc mounting means also mounting said filtrate flow direction changing means on said core.

22. A disc filter according to claim 4 and wherein:
    said mounting means comprising for each of said filter sections a plurality of rod members securing opposite sides of said filter sections to said core;
    said filtrate flow direction changing means each comprising a member mounted at opposite ends on said core by said rod members; and
    said member having said curved surface therewithin.

* * * * *

UNITED STATES PATENT OFFICE
CERTIFICATE OF CORRECTION

PATENT NO. : 3,960,729
DATED : June 1, 1976
INVENTOR(S) : C. Lynn Peterson and Clarence J. Peterson It is certified that error appears in the above-identified patent and that said Letters Patent are hereby corrected as shown below:

Column 3, line 31, after "member" delete "such" and insert therefor --being--. Column 4, line 13, delete "to".

Claim 7, line 2, delete "supported" and insert therefor --support--. Claim 22, line 1, delete "4" and insert therefor --21--.

Signed and Sealed this

Tenth Day of May 1977

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,960,729
DATED : June 1, 1976
INVENTOR(S) : C. Lynn Peterson and Clarence J. Peterson It is certified that error appears in the above-identified patent and that said Letters Patent are hereby corrected as shown below:

Column 2, line 64, after "with" insert --valve means including--. Column 6, line 21, after "by" insert --suitable sealing means in the form of--; line 24, delete "suitable sealing means in the form"; and line 25, delete "of".

Signed and Sealed this nineteenth Day of July 1977

[SEAL]

Attest:

RUTH C. MASON
*Attesting Officer*

C. MARSHALL DANN
*Commissioner of Patents and Trademarks*